US005613083A

United States Patent [19]
Glew et al.

[11] Patent Number: 5,613,083
[45] Date of Patent: Mar. 18, 1997

[54] TRANSLATION LOOKASIDE BUFFER THAT IS NON-BLOCKING IN RESPONSE TO A MISS FOR USE WITHIN A MICROPROCESSOR CAPABLE OF PROCESSING SPECULATIVE INSTRUCTIONS

[75] Inventors: Andrew F. Glew, Hillsboro; Haitham Akkary; Glenn J. Hinton, both of Portland, all of Oreg.

[73] Assignee: Intel Corporation, Santa Clara, Calif.

[21] Appl. No.: 316,089

[22] Filed: Sep. 30, 1994

[51] Int. Cl.$^6$ .................................................. G06F 12/10
[52] U.S. Cl. .......................................... 395/417; 395/418
[58] Field of Search .................................. 395/445, 479, 395/417, 416, 421.03, 375, 418

[56] References Cited

U.S. PATENT DOCUMENTS 5,455,924  10/1995  Shenoy et al. ............................ 395/445

OTHER PUBLICATIONS

Farkas, Keith I. and Norman P. Jouppi. Complexity/Performance Tradeoffs with Non–Blocking Loads. Proceedings of the 21st Annual International Symposium on Computer Architecture. pp. 211–222. Apr. 18–21, 1994.

Popescu, et al., "The Metaflow Architecture," IEEE Micro, pp. 10–13 and 63–73, Jun. 1991.

*Primary Examiner*—Jack A. Lane
*Assistant Examiner*—Kevin Verbrugge
*Attorney, Agent, or Firm*—Blakely, Sokoloff, Taylor & Zafman

[57] ABSTRACT

A translation lookaside buffer is described for use with a microprocessor capable of speculative and out-of-order processing of memory instructions. The translation lookaside buffer is non-blocking in response to translation lookaside buffer misses requiring page table walks. Once a translation lookaside buffer miss is detected, a page table walk is initiated to satisfy the miss. During the page table walk, additional memory instructions are processed by the translation lookaside buffer. Any additional instructions which cause translation lookaside buffer hits are merely processed by the translation lookaside buffer. However, instructions causing translation lookaside buffer misses while the page table walk is being performed are blocked pending completion of the page table walk. Once the page table walk is completed the blocked instructions are reawakened and are again processed by the translation lookaside buffer. Global and selective wakeup mechanisms are described. An implementation wherein the non-blocking translation lookaside buffer is provided within a microprocessor capable of speculative and out-of-order processing is also described.

30 Claims, 6 Drawing Sheets

FIG_1

FIG_2

FIG_3

FIG_4

FIG_5

FIG_6

ID> 5,613,083

TRANSLATION LOOKASIDE BUFFER THAT IS NON-BLOCKING IN RESPONSE TO A MISS FOR USE WITHIN A MICROPROCESSOR CAPABLE OF PROCESSING SPECULATIVE INSTRUCTIONS

BACKGROUND OF THE INVENTION

1. Field of the Invention

The invention generally relates to computer systems and, in particular, to the handling of translation lookaside buffer (TLB) misses within a computer system capable of performing speculative memory access operations.

2. Description of Related Art

Current state of the art microprocessors typically include one or more components for facilitating the processing of memory access operations. One such component is a data cache unit ("DCU") which stores a portion of data within a high speed memory. Typically, data from the most recently accessed external memory locations are stored within the DCU such that, if access to the data is required again, the data need not necessarily be retrieved from external memory. Another component commonly employed is the TLB which caches linear addresses and corresponding physical addresses for use in microprocessors wherein data is internally processed using only linear addresses. The TLB is used in connection with a page miss handler ("PMH") which performs a translation of a linear address to a physical address for those addresses not cached within the TLB. In use, the TLB is initially accessed to determine whether the TLB contains the physical address corresponding to a linear address for a desired memory location. If the linear and physical address are not cached within the TLB, then the PMH performs a page table walk to determine the physical address corresponding to the desired linear address. Typically, once the TLB detects a first miss and the PMH is activated to perform the page table walk, the TLB does not process further address translations. Such a TLB is referred to as a blocking TLB because it blocks further address translations while a previous TLB miss is being processed.

DCU, TLB and PMH memory systems components may be provided within microprocessors capable of performing operations either out-of-order or speculatively. Out-of-order processing occurs when a microprocessor executes a micro-instruction, herein also referred to as an instruction, in advance of a later-generated instruction. In other words, actual execution of instructions need not be performed in the same order in which the instructions are generated or in which the instructions appear in a software program. Speculative processing occurs in a microprocessor capable of executing instructions which occur subsequent to a branch condition, such as an "If" statement, before the branch condition is actually resolved. In such systems, the microprocessor "guesses" as to which of two or more branches is likely to be taken. Such operations are termed "speculative" since it is not known whether the operations can actually be committed until the branch condition is resolved. If the branch prediction is found to be correct, then the speculatively executed instructions are merely committed to memory, i.e., the speculative instructions are "retired". If the branch prediction is found to be incorrect, then the speculatively executed instructions must be squashed or flushed from the system.

As can be appreciated, the capability of performing operations speculatively can result in a great windfall in processing speed. Since the microprocessor need not wait for a branch condition to be resolved prior to executing subsequent instructions. The advantages of performing operations out-of-order or speculatively are ideally exploited in microprocessors which are also capable of pipelined executions wherein two or more operations are performed simultaneously.

Microprocessors capable of out-of-order or speculative execution of instructions are described in "Superscalar Microprocessor Design" by Mike Johnson, Prentice-Hall, Inc. 1991.

Although speculative processing has considerable advantages over non-speculative processing, certain questions arise while implementing a TLB within microprocessors capable of speculative execution. For example, if a TLB miss is detected for a speculative memory instruction, a question arises as to whether the TLB should block further address translations pending completion of the page table walk triggered in response to the miss. If the miss triggering the initial page table walk is a speculative instruction resulting from a mis-predicted branch, it may be wasteful to block further address translations pending completion of the page table walk. As such, it would be desirable to implement a TLB which is non-blocking in response to a TLB miss especially within a microprocessor capable of speculative or out-of-order execution of memory instructions and it is to that end that certain aspects of the invention are drawn.

BRIEF SUMMARY OF THE INVENTION

The invention generally relates to a translation lookaside buffer for use within microprocessors capable of speculative execution of instructions wherein the TLB is non-blocking in response to address translation misses.

In accordance with one aspect of the invention, the TLB triggers a page table walk within a PMH in response to a first miss of a memory load or store instruction. The TLB then continues to process address translations for subsequent memory instructions. If the page table walk for handling the first miss is still being processed when a second miss is detected, then the memory instruction causing the second miss is blocked pending completion of the pending page table walk. Blocking is performed within a memory ordering buffer (MOB) connected to the TLB and PMH. The TLB then processes additional address translations. For each additional instruction, if a hit is detected, the TLB merely outputs the physical address corresponding to the memory instruction. If a miss is detected and the first page table walk is still pending, the additional memory instruction is blocked within the MOB along with other blocked memory instructions.

Once the first page table walk completes, each of the memory instructions blocked in the MOB because of the pending page table walk is unblocked or "awakened" and re-dispatched to the TLB. The TLB again attempts an address translation for each of the memory instructions. As a result of code locality, the recently awakened memory instructions will likely correspond to the page found in the completed page table walk. As such, hits will be detected and the TLB will simply output the corresponding physical addresses. Ultimately, another miss may be detected and another page table walk initiated. As before, further memory instructions processed by the TLB are blocked if a miss is detected or are merely processed if a hit is detected.

In this manner, address translations within the TLB are performed efficiently. Only those memory instructions which miss the TLB are blocked pending completion of a previous page table walk. All other memory instructions are processed by the TLB as if no previous miss occurred and no page table walk is pending. This is in contrast with many conventional microprocessors wherein the TLB blocks all further address translations pending completion of a previous page table walk.

As far as the awakening and re-dispatching of blocked memory instructions is concerned, the MOB may, depending upon the implementation, execute either a global or a selective wakeup. With a global wakeup, all memory instructions blocked pending completion of a page table walk are awakened and re-dispatched in a sequential order. The oldest memory instructions are dispatched first. With a selective wakeup, the MOB first wakes up only those memory instructions which were blocked pending retrieval of the same page retrieved by the just completed page table walk. As such, upon re-dispatch to the TLB, awakened memory instructions are guaranteed to hit the TLB. Thereafter, any remaining memory instructions blocked pending retrieval of other pages are re-dispatched. The remaining memory instructions will cause an immediate TLB miss thereby triggering a new page table walk. By employing a selective wakeup, greater efficiency can be gained. However, the greater efficiency is at the expense of more complex logic and more complex hardware. In many implementations, the global wakeup is sufficient and any advantage gained by employing a selective wakeup is lost as a result of the requirement for more complicated logic.

Thus, the invention provides a TLB which is non-blocking as a result of an address translation miss. By continuing to process further address translations while an initial page table walk is executing, overall processor efficiency is improved. Other advantages, objects and features of the invention will be apparent from the drawings and from the detailed description of the invention which follows.

DETAILED DESCRIPTION OF THE INVENTION

Referring to the figures, preferred embodiments of the invention will now be described.

Figure 1:
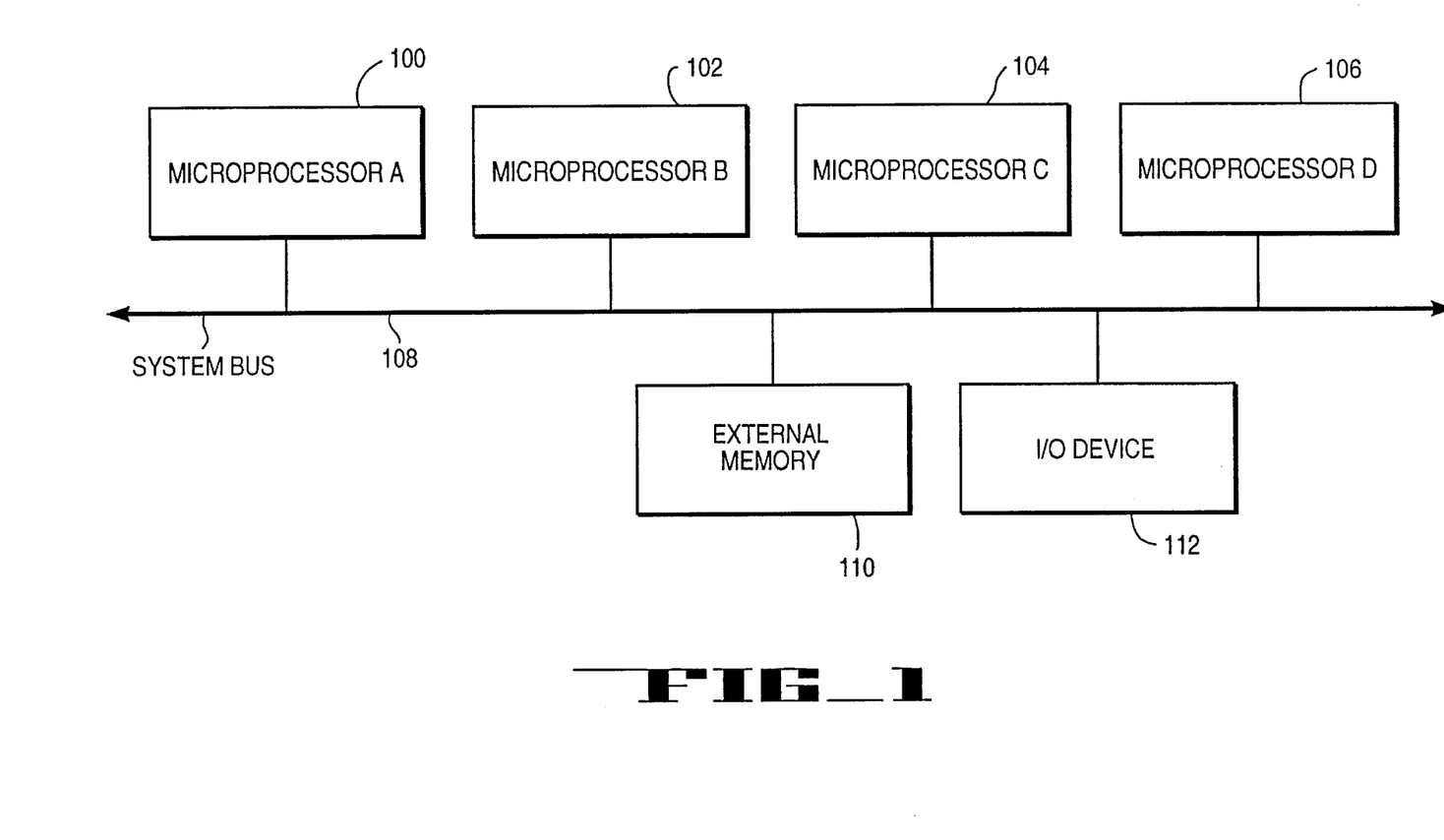
FIG. 1 is a block diagram illustrating a computer system having multiple microprocessors, each configured in accordance with a preferred embodiment of the invention.

FIG. 1 illustrates a multiprocessor computer system having four individual microprocessors 100, 102, 104, and 106 interconnected by a system bus 108. A main memory 110 and an input/output device 112 are also connected to system bus 108. Main memory 110 may include a wide range of memory storage units including ROM's, RAM's and the like. I/O device 112 may include any of a number of input or output devices such as keyboards, CRT displays, and the like. Each of the microprocessors illustrated in FIG. 1 may be identical. Each microprocessor may be capable of speculative and out-of-order execution of instructions.

Figure 2:
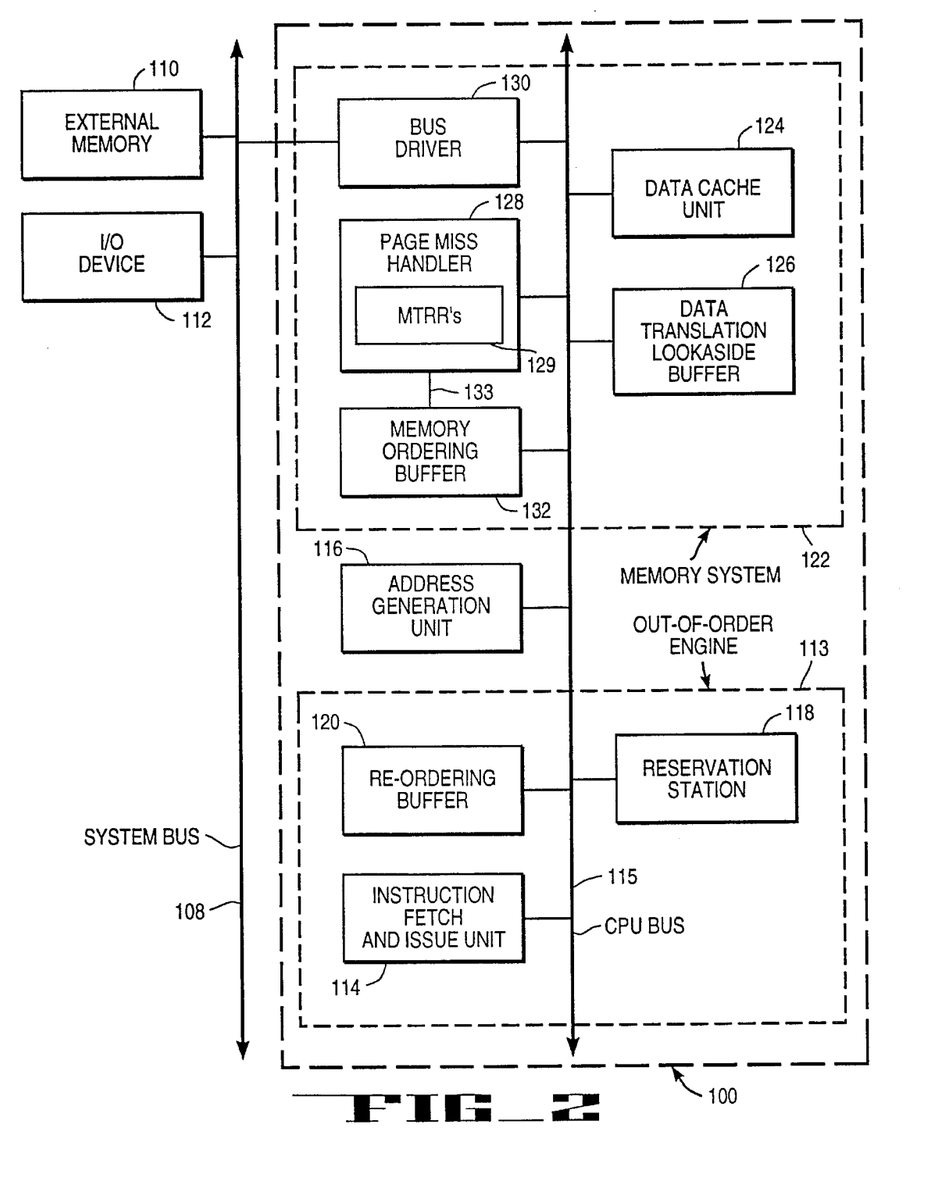
FIG. 2 is a block diagram illustrating selected functional components of one of the microprocessors of FIG. 1, particularly illustrating a PMH, a MOB and a TLB collectively configured for allowing the TLB to be non-blocking in response to an address translation miss.

FIG. 2 illustrates selected functional components of microprocessor 100 of FIG. 1. In particular, FIG. 2 illustrates an out-of-order engine 113 which generates computer instructions, referred to herein as micro-operations or "uOP's", such as memory loads and stores. The uOP's are, in general, generated by out-of-order engine 113 in a sequence which may differ from the sequence in which the instructions appear within a user's computer program. Further, out of order engine 113 is capable of making predictions at branch conditions, such as "If" statements, then speculatively generating instructions subsequent to the branch condition. The instructions are generated out-of-order and speculatively, in part, to allow microprocessor 100 to exploit any parallelism within the computer code to be executed and to exploit pipelining capability of the microprocessor.

Out-of-order engine 113 includes an instruction fetch and issue unit 114 for issuing uOP's and an RS 118 for allocating uOP's that have not yet been executed, then dispatching the uOP's to other functional units according to speculative data dependencies and according to the availability of the other functional units.

Out-of-order engine 113 also includes a ROB 120 which stores speculative results from instructions dispatched by RS 118 and executed by one of the functional units. ROB 120 collects the results from speculative uOP's, reorders the uOP's, then retires the uOP's. Whereas the uOP's may be dispatched from out-of-order execution engine 113 in an order other than that which appears in a computer program, ROB 120 reorders the uOP's to yield the sequence of events specified by the computer program.

The linear addresses for instructions dispatched by RS 118 are calculated by address unit 116. The uOP's are dispatched from out-of-order engine 113 in either a protected mode or in a real mode. In protected mode, the linear address for the uOP is calculated by AGU 116. In real mode, AGU 116 calculates a physical address for the uOP. In the following, protected mode operation will be assumed. The uOP, containing the linear address or physical address, is output from AGU 116 onto CPU bus 115 for routing to a functional unit of the microprocessor for execution of the uOP.

uOP's which involve memory accesses such as memory loads and memory stores are executed by a memory system 122. Memory system 122 includes a DCU 124, a DTLB 126, a PMH 128, a memory system bus driver 130, and a MOB 132. MOB 132 stores all uOP's received by the memory system, reorders the uOP's as needed and, as will be described below, blocks certain uOP's. DTLB 126 maintains a cache of address translations between linear addresses and corresponding physical addresses. In use, a uOP dispatched by RS 118 is intercepted from CPU bus 115 by DTLB 126 which performs a look-up to determine whether its internal cache lines contain the physical address corresponding to the linear address of the uOP. If the address translation is found therein, DTLB 126 re-dispatches the uOP, updated to include the physical address, onto CPU bus 115. If the address translation is not found therein, DTLB 126 transmits a signal to PMH 128 to initiate a page table walk to determine the physical address corresponding to the linear address of the uOP.

If PMH 128 is not busy performing a previously initiated page table walk, then PMH 128 begins the page table walk on behalf of the uOP. If PMH 128 is currently busy processing a page table walk, the PMH transmits a signal to MOB 132 indicating that the uOP (which is already stored therein) is to be blocked pending completion of the current page table walk. Once the initial page table walk is completed, the DTLB is updated. MOB 132 reawakens all uOP's blocked as a result of the PMH being busy and sequentially re-dispatches those uOP's to DTLB 126 which again attempts an address translation. As a result of the completion of the previous page table walk and the updating of the DTLB with new page information, the re-dispatched uOP's may result in hits within the DTLB, thus allowing for immediate address translation. Ultimately, a subsequent miss will likely occur, perhaps from one of the re-dispatched uOP's or from a new uOP received from out-of-order engine 113. Upon detection of the subsequent miss, PMH 128 is again activated to perform a page table walk and further uOP's causing DTLB misses while the page table walk is pending are blocked in the MOB.

DCU 124 includes internal cache lines maintaining data for many of the most recently accessed memory locations. DCU 124 intercepts uOP's containing physical addresses and accesses internal cache lines to determine if the data for the memory access of the uOP's are already contained therein. If the data is contained within DCU 124, the data is retrieved from the internal cache lines and dispatched onto CPU bus 115 for further processing by other functional units of microprocessor 100, such as ROB 120. If the data is not found within DCU 124, system bus driver 130 is accessed to transmit memory requests to external memory 110 to access the data specified by the uOP. Preferably, DCU 124 is capable of processing data using any one of several cache protocols such as write-back and write-through cache protocols. A memory-type value, which may be cached within DTLB 126, is used in determining which cache protocol is appropriate for a particular uOP.

As noted, if the translation between the linear address and a physical address for the uOP is not cached within DTLB 126, then PMH 128 performs a page table walk to determine the corresponding physical address. If the uOP causing the DTLB miss is a non-speculative uOP, PMH 128 performs a non-speculative page table walk. If, however, the uOP causing the DTLB miss is a speculative uOP, then PMH 128 performs a page table walk speculatively. Details of the manner by which PMH 128 performs speculative page table walks are provided within patent application Ser. No. 08/176,363, "Method And Apparatus For Performing Page Table Walks In A Microprocessor Capable Of Processing Speculative Instructions", by Andrew F. Glew, Glenn Hinton and Haitham Akkary, filed Dec. 30, 1993. PMH 128 also includes a set of memory-type range registers (MTRR's) 129 which relate physical addresses to memory types. The memory-type range registers stored within the PMH are provided to allow the memory type for a particular uOP to be determined such that the cacheability or uncacheability of the memory location specified by the uOP may subsequently be determined. Further details regarding the memory type values may be found in the various co-pending applications incorporation by reference herein. Such details are not pertinent to the present invention.

As noted, MOB 132 re-orders memory accesses. More specifically, the MOB maintains lists (FIG. 5) of memory loads and stores and checks the loads and stores for possible adverse memory effects. MOB 132 reorders the memory access operations accordingly and may postpone execution of particular memory access operations until ordering problems are resolved. For example, the MOB blocks execution of any memory uOP's that are not at retirement and are known to be non-speculateable.

Figure 3:
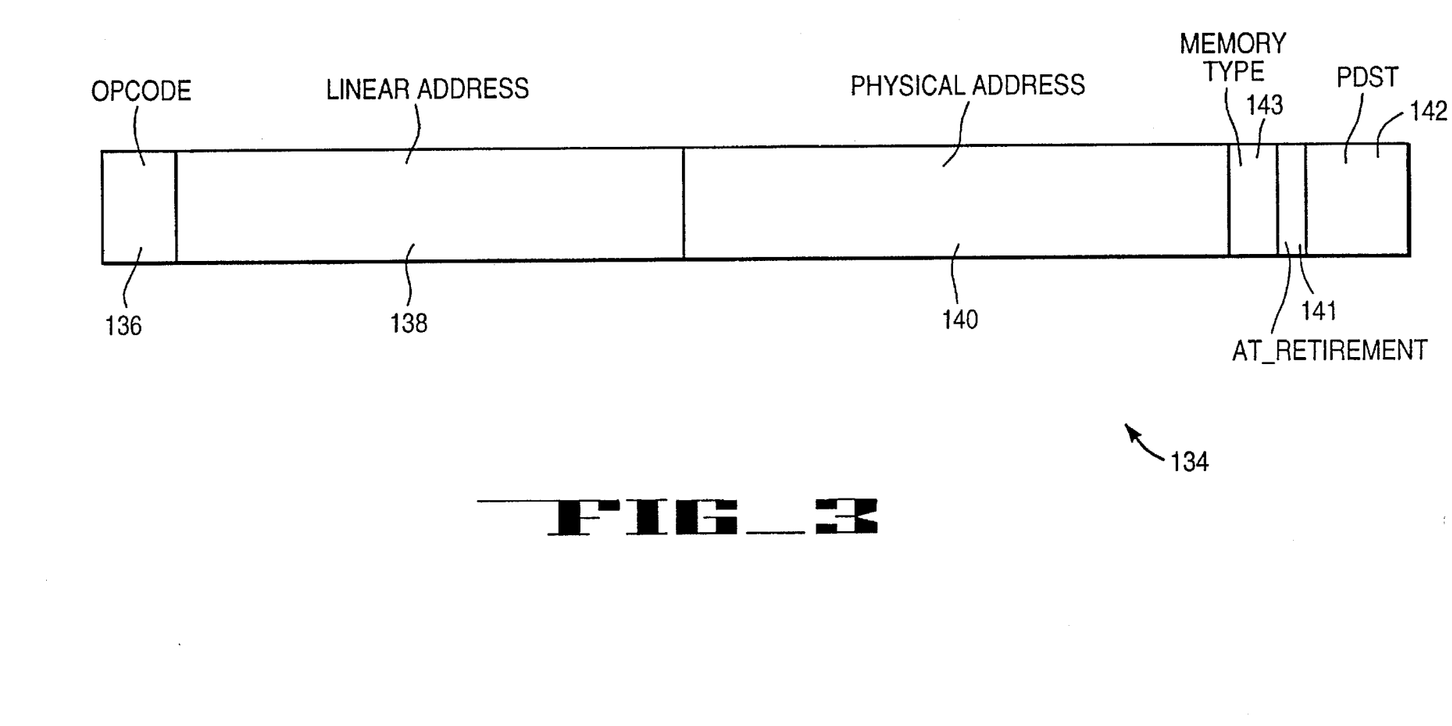
FIG. 3 is a block diagram symbolically illustrating an operational code executed by the microprocessor of FIG. 2.

An exemplary uOP 134 is symbolically illustrated in FIG. 3. uOP 134 includes an operational code (OPCODE) 136, space for a linear address 138, space for a physical address 140 and space for a physical destination address (PDST) 142. OPCODE 136 is a code indicating the type of operation to be performed and may, for example, identify a memory store or memory load operation. PDST 142 stores a code which identifies the destination within microprocessor 100 of the results of the uOP. PDST 142 also stores a code representative of the relative age of the uOP. Linear and physical address sections 138 and 140 store the linear and physical addresses, respectively, if known. uOP 134 also stores an at-retirement bit 141 and a memory-type value 143. At-retirement bit 141 identifies whether the uOP is executing at retirement. As noted above, if a uOP is at retirement, it is no longer speculative. A uOP which is not yet at retirement, may be speculative. Memory-type value 143 is a value indicating, for example, the speculatability of the memory location to be accessed by the uOP. Unless the memory type value is found within DTLB 126 as a result of a DTLB hit, the memory-type may not be known. The memory type is determined during a page table walk performed in response to the DTLB miss by accessing MTRR's 129.

uOP 134 may additionally include a wide range of other information for facilitating the processing and execution of the uOP. For brevity and clarity, such additional information is not described herein. In practical implementations, the actual uOP need not specifically store both the linear and physical addresses. Indeed, the linear and physical address may be provided on separate bus lines. Further information regarding the uOP's structure may be found in the copending patent applications referenced herein.

The foregoing provides a brief overview of the operation of microprocessor 100, particularly the manner by which the microprocessor handles DTLB misses while the PMH is busy performing a page table walk in response to a previous DTLB miss.

FIGS. 1–3 illustrate only relevant functional components of the microprocessor system. For clarity, numerous implementation details are not explicitly shown. For example, the single CPU bus illustrated in the figures may actually include several separate bus lines including separate buses for linear addresses, physical addresses, write-back results from the DCU and OPCODE's. Also, the separate physical address of the bus may be interconnected only to the PMH, DTLB and DCU. In other words, not all units need access to physical addresses. The out-of-order engine may include separate internal components such as a sequential instruction fetch, a micro-code unit, an instruction decoder and an allocater unit. Also, integer and floating point units may be included within the microprocessor which are not expressly illustrated. A separate instruction TLB may also be provided.

With reference to the remaining figures, the method and apparatus by which uOP's resulting in DTLB misses are processed will be described in greater detail.

Figure 4:
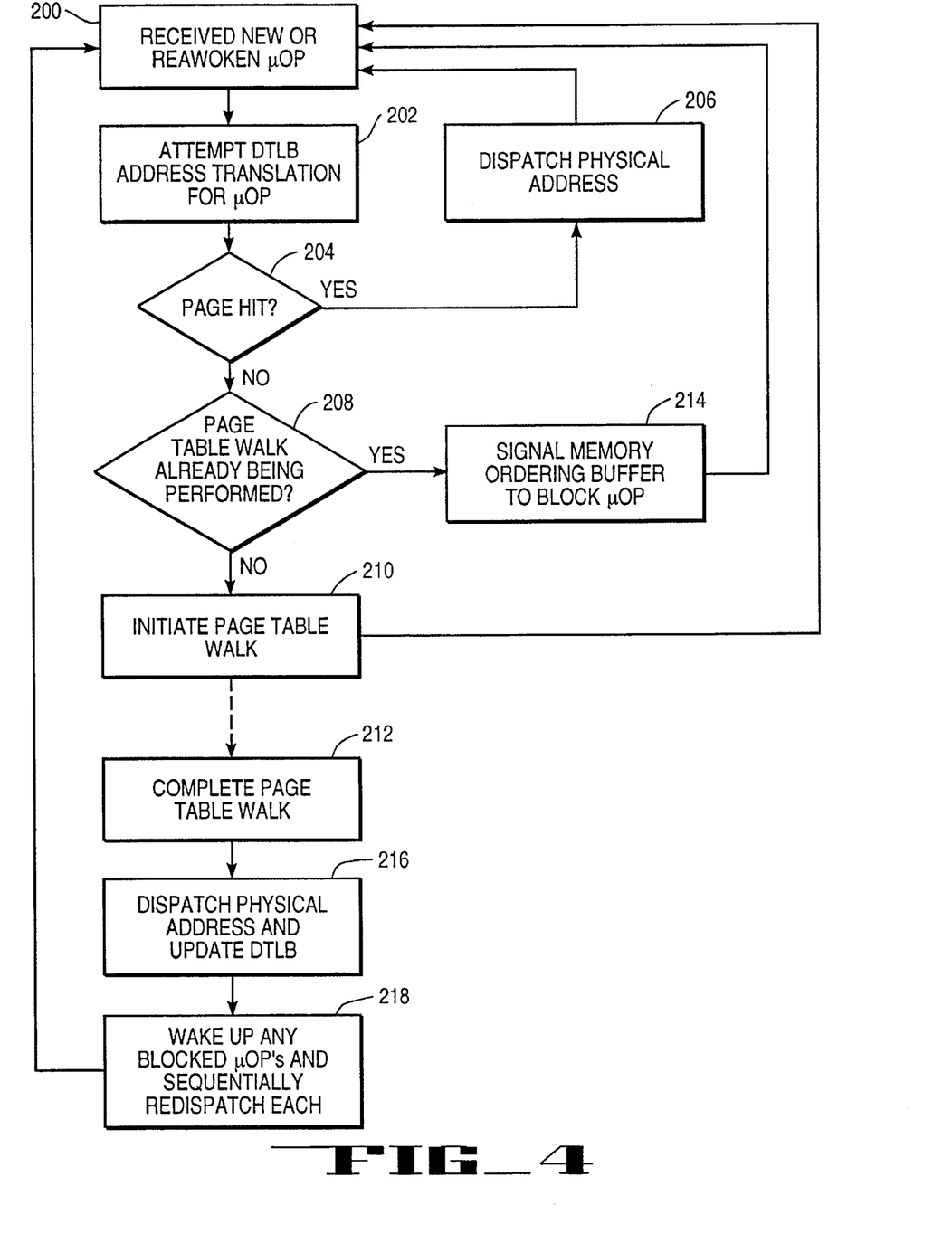
FIG. 4 is a block diagram illustrating a method for processing memory instructions causing a TLB miss.

FIG. 4 illustrates, in flow chart form, the method by which microprocessor 100, in general, and DTLB 126, PMH 128 and MOB 132, in particular, handle uOP's causing DTLB misses while PMH 128 is busy. Although FIG. 4 illustrates method steps in flow chart form, those skilled in the art will appreciate that each block of the flow chart also represents a device or circuit within microprocessor 100 for performing the described action. In some cases, the action may be performed by dedicated hardware. In other cases, the action may be performed by micro-code or other types of software. The details by which the steps of FIG. 4 are actually implemented in hardware or software are not necessarily pertinent to the invention and will not be described in detail, unless noted.

The method by which the MOB, DTLB and PMH operate to block uOP's will be described primarily with reference to the flow chart of FIG. 4, but also with occasional reference to the microprocessor component block diagram of FIG. 3 and to the MOB component block diagram of FIG. 5.

Initially, at 200 the DTLB receives a new uOP from CPU bus 115 (FIG. 2). By a new uOP, it is meant that the uOP has not been received or processed by the DTLB. Rather, the uOP is newly received from the out-of-order engine. The DTLB may also receive reawakened uOP's from the MOB. By "reawakened", it is meant that the uOP was previously received by the DTLB but blocked by the MOB, then re-dispatched.

At 202 the DTLB accesses its internal cache lines in an attempt to perform an address translation for the uOP received at 100. If the physical address corresponding to the linear address of the uOP is contained within the cache lines of the DTLB then, at 204, a DTLB hit is detected and execution proceeds to step 206 where the physical address found within the DTLB is inserted into the uOP which is then re-dispatched on to the CPU bus for further processing by other components. Execution then returns to step 200 where the DTLB receives another new or reawakened uOP and attempts an address translation for that uOP as well. Execution continues in the loop represented by steps 200, 202, 204 and 206, until a uOP is received which causes a DTLB miss at step 204. A miss occurs if the physical address for the linear address of the uOP is not stored within the internal cache lines of the DTLB. To determine the physical address for the uOP, a page table walk must therefore be performed by the PMH.

Execution proceeds to step 208 where the microprocessor determines whether the PMH is already busy performing a page table walk for a previous uOP. In one implementation, this determination is made by dispatching the uOP from the DTLB to the PMH along the CPU bus. The PMH, upon receiving the uOP, examines an internal state machine to determine whether a page table walk is already in process for another uOP. In the present example, where the new uOP under consideration is the first uOP causing a DTLB miss, no page table walk is in progress and, accordingly, execution proceeds to step 210 where the PMH initiates a page table walk. The page table walk may be entirely conventional. However, in the exemplary system which is capable of processing speculative instructions, the uOP causing the page table walk may be speculative. The manner by which the PMH handles page table walks for speculative uOP's is described in the above-referenced patent application.

Completion of the page table walk requires accessing various page table memory structures and may therefore be fairly time-consuming as compared to the time required to process uOP's within the DTLB. In FIG. 4, the page table walk is shown being completed at step 212. A dotted line interconnects steps 210 and 212 to indicate the time delay between commencement of the page table walk and completion thereof. During this time period, execution also continues from step 210 to step 200 where the DTLB receives additional uOP's for processing therein. In other words, the DTLB is not stalled as a result of the previous DTLB miss or as a result of the commencement of the page table walk. Rather, the DTLB continues to receive uOP's at step 200 and continues to attempt address translations for the uOP's at step 202. If the physical addresses for the new uOP's are found within the cache lines of the DTLB, then hits are detected at 204 and the uOP's are re-dispatched along with their physical addresses at step 206.

In this manner, numerous uOP's may be processed by the DTLB while the page table walk is being performed by the PMH. During the page table walk, however, it is possible that a new or reawakened uOP received by the DTLB may cause a DTLB miss. For that uOP, execution proceeds to step 208 where it is determined that a page table walk is already being performed, i.e. the PMH is busy. In the exemplary implementation, the PMH is not capable of performing two page table walks simultaneously. Accordingly, the uOP causing the second DTLB miss is blocked at step 214. Blocking is achieved by transmitting a signal to the MOB indicating that the uOP needs to be blocked pending completion of the current page table walk. Depending upon the implementation, the signal may be sent from the DTLB or from the PMH. As noted, the MOB records and tracks all uOP's within the memory system and therefore already has a copy of the uOP stored within its internal memory structures. Accordingly, the PMH need only transmit a signal identifying the uOP by its OPCODE to the MOB and need not transmit the entire uOP.

The MOB stores the uOP within either a load buffer or a store buffer along with an indication of the age of the uOP and the reason for the block. The MOB is capable of blocking uOP's for a variety of reasons and therefore must be able to distinguish between uOP's block pending completion of a page table walk and uOP's blocked for other reasons.

Figure 5:
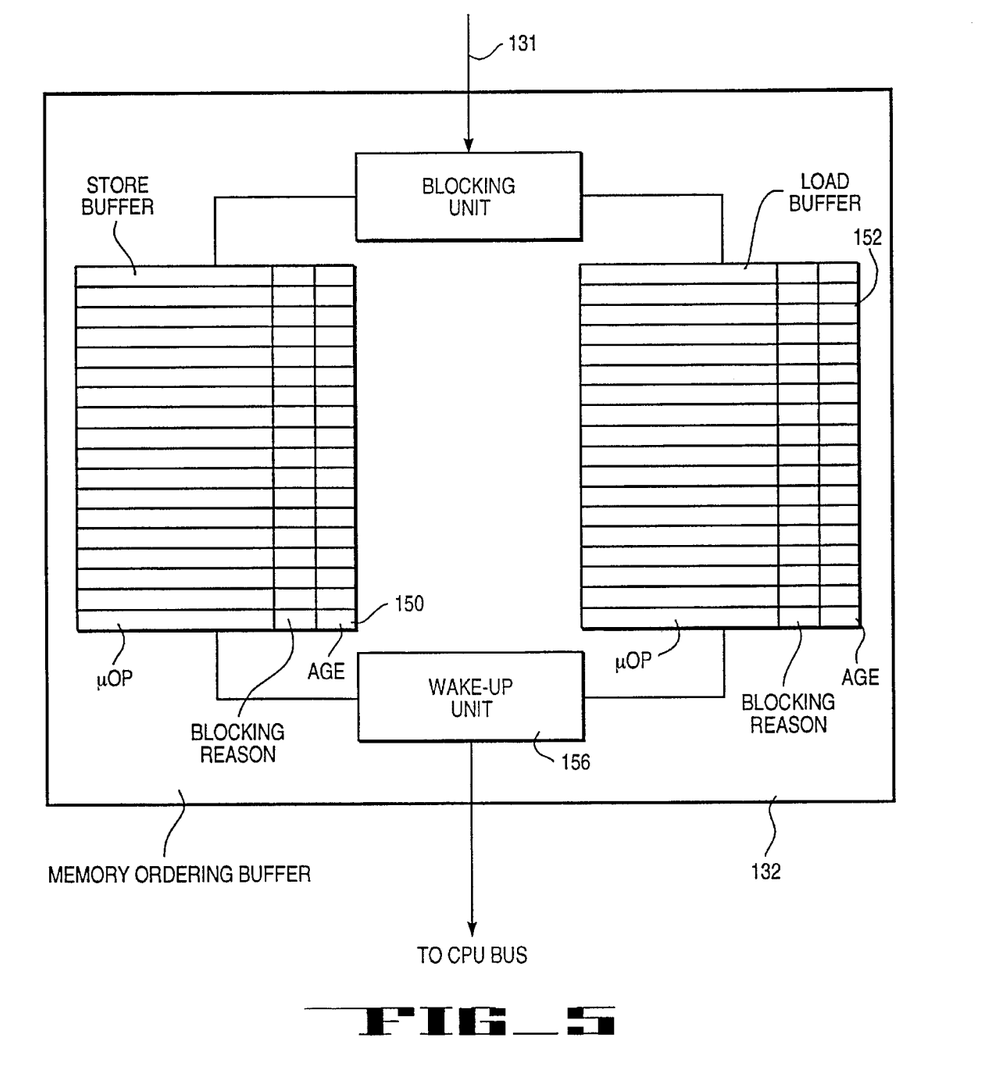
FIG. 5 is a block diagram illustrating a portion of the MOB of FIG. 2, and particularly illustrating load and store buffers where memory instructions are stored pending completion of a page table walk.

With reference to FIG. 5, relevant internal components of MOB 132 will now be described. MOB 132 includes a store buffer 150 for storing store uOP's and a load buffer 152 for storing load uOP's. Each entry of the load and store buffers stores a uOP, a code indicating whether the load or store is blocked and, if blocked, identifying the reason for the block, and a code indicating the age of the uOP. In the exemplary implementation, the PDST value illustrated in FIG. 3 is employed to identify the age of the uOP. Hence, a separate age field need not be provided within the load and store buffers. After a period rather, the MOB may simply access the PDST value within the store uOP to determine the age thereof. For clarity, however, FIG. 5 illustrates a separate age field. As noted, the MOB tracks and stores all uOP's within the memory cluster, regardless of whether the uOP is blocked. Accordingly, the uOP to be blocked is already stored within either load buffer 150 or store buffer 152 prior to receipt of the block signal from the PMH along line 131. As such, blocking unit 154 merely locates the uOP within the load or store buffer and marks the uOP as being blocked. This is achieved by comparing the OPCODE received along line 131 with the various OPCODEs stored within the uOP fields of the load and store buffers. Once the uOP is found, blocking unit 154 marks the uOP as being blocked and stores the code indicating that the uOP is blocked pending completion of the page table walk. Numerous additional details regarding the operation of the MOB, particularly the manner by which the MOB blocks uOP's, may be found in copending U.S. patent application Ser. No. 08/176,804, entitled "Method And Apparatus For Performing Load Operations In A Computer System" filed Jan. 4, 1994, assigned to the assignee of the present application.

Referring again to FIG. 4, once the uOP is blocked at step 214, execution again returns to step 100 where the DTLB receives further uOP's which either result in further DTLB hits or further DTLB misses. For each further hit, the uOP is updated with the physical address found within the cache lines of the DTLB and dispatched from the DTLB. For each further miss which occurs while the PMH remains busy, the uOP causing the miss is blocked by the MOB. Hence, during the execution of the first page table walk, numerous uOP's may be processed by the DTLB, and many of those uOP's may be blocked within the MOB pending completion of the page table walk.

Eventually, the page table walk completes at step 212. The uOP is updated with the physical address found during the page table walk and is redispatched from the PMH for processing by other microprocessor components. The cache lines of the DTLB are also updated to cache the newly found physical addresses therein, at 216. At 218, the PMH transmits a signal along dedicated line 131 to the MOB indicating that the PMH is no longer busy. The MOB then proceeds to wakeup each of the uOP's that had been previously blocked pending completion of the page table walk. This is performed by a MOB wakeup unit 156, shown in FIG. 5, which identifies each entry within the load and store buffers containing uOP's previously marked as blocked pending completion of the page table walk. Wakeup unit 156 then dispatches the uOP's to the DTLB via the CPU bus in a sequential pipelined order. The order of the uOP's is based upon the relative age value represented by the PDST value of uOP's. The oldest uOP is dispatched first, then each remaining uOP is awakened and dispatched in chronological age order. It should be noted that the age represented by the PDST value is based upon the time at which the uOP is originally created and dispatched by the out-of-order execution unit. Accordingly, the age does not necessarily represent the time at which either the DTLB, PMH or MOB receives the uOP.

The wakeup performed at step 218 is referred to herein as a global wakeup because all uOP's blocked pending completion of the page table walk are awakened. An alternative embodiment will be described below with reference to FIG. 6 wherein only those uOP's blocked pending retrieval of the particular memory pages accessed during the just completed page table walk are awakened.

The uOP's awakened at step 218 are then sequentially received by the DTLB at step 200 which attempts address translations at step 202. Because the DTLB cache lines have now been updated with new physical address information found during the just completed page table walk, many of the reawakened uOP's cause a DTLB hit, rather than a DTLB miss. Accordingly, physical addresses for those uOP's are dispatched at step 206. Eventually, either one of the reawakened uOP's or perhaps a new uOP received by the DTLB, causes another page miss triggering a second page table walk. Once the second page table walk is commenced, any further uOP's (either reawakened uOP's or new uOP's) causing DTLB misses are blocked as previously described. However, any of the uOP's which do not cause DTLB misses continue to be processed by the DTLB and updated to contain their physical addresses.

Eventually, the second page table walk completes and any uOP's blocked pending completion of the second page table walk are reawakened. This general process continues throughout the operation of the microprocessor.

It should be noted that some uOP's may be blocked, reawakened, then blocked again, perhaps repeatedly, until finally being fully processed and updated with the corresponding physical address. This can occur because the MOB awakens all uOP's upon the completion of each page table walk. It is possible that the first and second uOP's awakened by the MOB, i.e. the two uOP's having the oldest ages, may both cause a DTLB miss. The first of those uOP's therefore triggers a new page table walk and the second of those two uOP's must be blocked a second time. In general, however, because of code locality, many of the reawakened uOP's cause DTLB hits as a result of the DTLB cache lines being updated upon completion of a previous page table walk. If there is little or no code locality, then the general process of FIG. 4 may result in some uOP's being repeatedly blocked and reawakened.

Figure 6:
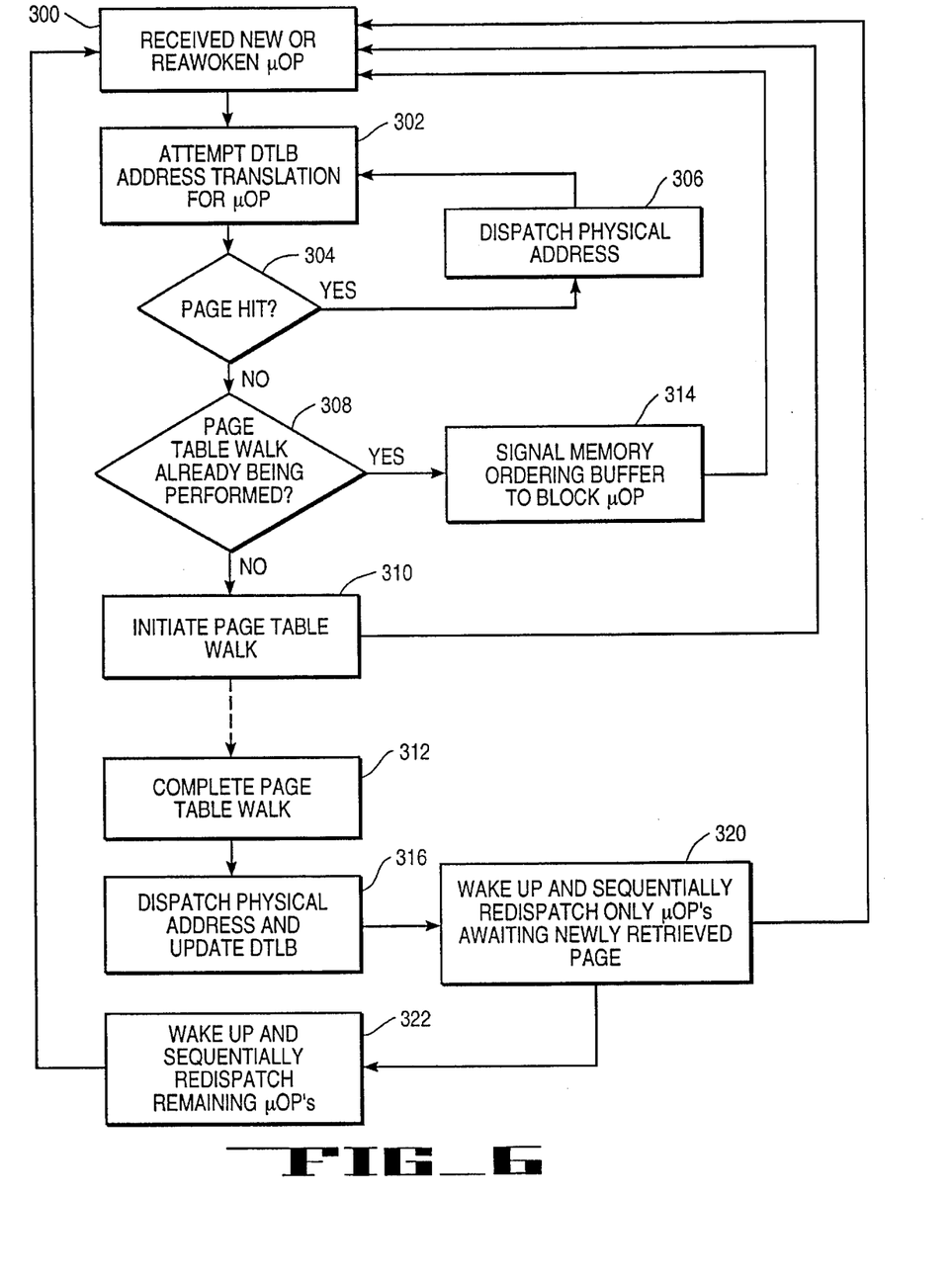
FIG. 6 is a block diagram illustrating a method and apparatus for processing memory instructions causing TLB misses, configured in accordance with an alternative embodiment of the invention.

FIG. 6 illustrates an alternative embodiment wherein a selective wakeup is employed to wakeup only those uOP's blocked pending retrieval of page information of a currently executing page table walk. Thus, whereas the MOB associated with FIG. 4 merely stores the blocked uOP's along with an indication that the uOP's are blocked pending completion of a current page table walk, a MOB configured for use with the method of FIG. 6 also stores an indication of the particular page of memory needed for satisfying the physical address translation for that uOP. Then, upon completion of a page table walk, the MOB first reawakens all uOP's which had been waiting for the page information accessed during the just completed page table walk. Thereafter, the MOB reawakens any remaining uOP's blocked because the PMH was busy. As such, the first set of reawakened uOP's each cause DTLB hits. This is because each of the first group of uOP's were blocked pending retrieval of the page information updated within the DTLB upon completion of the page table walk. Once each of the first set of uOP's are processed by the DTLB, then the uOP's of the second set are processed and, since those uOP's had previously caused a DTLB miss and since those uOP's were awaiting page information not retrieved during the previous page table walk, the uOP's of the second group all cause DTLB misses. The first uOP of the second set triggers a page table walk and the remaining uOP's of the second group are blocked again by the MOB. As can be appreciated, other variations may be implemented consistent with the general principles of the invention. For example, only a single uOP of the second set of uOP's may be reawakened such that all other uOP's of the second set need not be reawakened then reblocked.

The sequence of steps just described is illustrated within FIG. 6. Many of the method steps of FIG. 6 correspond with those of FIG. 4 and accordingly will not be redescribed. For blocks that correspond, like reference numerals are employed, incremented by 100.

The method of FIG. 6 includes steps 300–314 which may be the same as corresponding steps of FIG. 4. However, after step 316 of FIG. 6, rather than waking up all uOp's blocked pending completion of a page table walk, the MOB reawakens only those uOP's awaiting the newly retrieved page, at step 320. Then, at step 322, any remaining uOP's blocked pending completion of a page table walk are re-dispatched. As a result Of this selective wakeup, the uOP's redispatched at step 320 are received by the DTLB, at step 300, before uOP's dispatched at step 322. Further processing of the uOP's precedes as described above with reference to FIG. 4 with the various uOP's either causing DTLB hits or misses, and with a page table walk being triggered in response to the next DTLB miss. As before, any uOP's causing a DTLB miss are processed by the DTLB, even though a page table walk may currently be in progress.

Thus, the embodiment of FIG. 6 is similar to that of FIG. 5, but provides for a selective wakeup of blocked uOP's. The selective wakeup is easily implemented within the microprocessor described herein since the MOB is already configured with the capability of performing selective wakeups. More specifically, the MOB of FIG. 4 is configured for awakening uOP's blocked as a result of a page table miss as opposed to uOP's blocked for other reasons. Accordingly, only fairly slight modification is required to allow the MOB to further distinguish among the uOP's blocked as a result of a page table miss based upon the memory pages required by those uOP's.

The selective wakeup is particularly effective for use within microprocessors capable of multi-threading wherein different threads of execution are handled in parallel. Selective wakeup is effective in such microprocessors because there is a generally lower degree of code locality within multi-threading microprocessors than in single thread microprocessors.

In either of the two embodiments, the memory structures required by the PMH to complete the page table walk should be independent from any of the memory structures accessed by the various blocked uOP's. If not, a deadlock condition could occur. More specifically, the page table walk could be blocked pending retirement of one or more of the uOP's which is itself blocked pending completion of the page table walk. By ensuring that the memory structures required by the PMH for completion of the page table walk are independent from any memory structures modifiable by the load or store uOP's, the page table walk is thereby guaranteed to complete, or at least cause an error or exception which can be handled, thus preventing a deadlock condition.

A fault detected by the PMH during a page table walk does not immediately cause the page table walk to abort or the overall microprocessor pipeline to be stalled or flushed. Rather, the page table walk proceeds to completion, DTLB cache lines are updated, and any blocked uOP's are redispatched. Ultimately, when the uOP causing the page table walk resulting in the error retires, retirement logic within the reservation station handles the fault. At that time, the pipeline is flushed. The handling of faults is described in a copending U.S. patent application Ser. No. 08/315,833, entitled "Method And Apparatus For Implementing A Non-Blocking Translation Lookaside Buffer", filed Sep. 30, 1994, assigned to the assignee of the present application.

Also, it should be noted that the PMH of the exemplary embodiment executes a page table walk for uOP's which missed the DTLB even if those uOP's were previously blocked by the MOB for other reasons. For example, a load uOP may be blocked by the MOB pending retirement of an older store uOP to the same memory location. Such is required in an out-of-order and speculative system to prevent data corruption.

Hence, a page table walk may be performed based on a uOP which is blocked by the MOB. Upon completion of the page table walk, the DTLB cache lines are updated. However, because the uOP is blocked, the uOP is not immediately reawakened and re-displatched by the MOB. Rather, the uOP is reawakened, if at all, only after the previous blocked condition is resolved. Then, assuming that the physical address data is still cached within the DTLB, the reawakened uOP will cause a DTLB hit and the physical address of the uOP will be updated. It is, however, possible that the physical address information within the DTLB will already have been overwritten by the time the uOP is reawakened by the MOB. As such, the page table walk will need to be reexecuted.

Thus far a system for handling DTLB misses has been described. The microprocessor may additionally have an instruction TLB (ITLB) for caching the linear and physical addresses for instructions. In an exemplary implementation, the ITLB is a blocking TLB. As such, once a page table walk is triggered in response to an ITLB miss, the ITLB is stalled and any further uOP's are thereby effectively blocked. Such blocking does not require use of the MOB. Rather, the ITLB merely refuses to handle any further instruction uOP's. In alternative implementations, the ITLB may be non-blocking in a manner similar to that of the DTLB and similar selective or global wakeup mechanisms may be employed. In one possible implementation, uOP's to be blocked as a result of an ITLB miss causing a page table walk are injected into the overall microprocessor pipeline and are ultimately allocated and stored within the MOB, then reawakened therefrom.

What has been described is a method and apparatus for implementing a TLB which is non-blocking in response to TLB misses requiring page table walks. The invention is advantageously implemented within microprocessors capable of speculative or out-of-order processing. However, principles of the invention may also be applicable to in-order and non-speculative microprocessors as well. Furthermore, although the invention has been described with respect to an exemplary embodiment employing Intel Architecture, principles of the invention may also be applicable within other microprocessor architectures, including the PowerPC™ Architecture. In general, the embodiments described herein are merely exemplary and illustrative of the invention and should not be construed as limiting the scope of the invention.

What is claimed is:

1. In a microprocessor having a translation lookaside buffer and a page miss handler, a method for processing virtual address to physical address translations, said method comprising the steps of:

receiving a first instruction having a first virtual address to be translated into a physical address;

determining whether the physical address corresponding to the first instruction is stored in the translation lookaside buffer and if not, initiating a page table walk within the page miss hander for determining the physical address, otherwise outputting the physical address corresponding to the first instruction;

receiving a second instruction having a second virtual address to be translated into a physical address;

determining whether the physical address corresponding to the second instruction is stored in the translation lookaside buffer;

if the physical address of the second instruction is not stored in the translation lookaside buffer and the page miss handler is busy completing a page table walk,
 blocking the second instruction until the page table walk for the first instruction is complete, then
 re-attempting the address translation for the second instruction;

if the physical address for the second instruction is stored in the translation lookaside buffer,
 outputting the physical address corresponding to the second instruction; and
 completing the page table walk for the first instruction.

2. The method of claim 1, including the further steps of receiving additional instructions to be translated into physical addresses; and determining whether the corresponding physical addresses of the additional instructions are stored in the translation lookaside buffer, and if not and if the page miss handler is busy, blocking each of the additional instructions pending completion of the page table walk.

3. The method of claim 2, wherein a plurality of second instructions are blocked pending completion of the page table walk and wherein all of the additional instructions are reawakened and instruction translations are reattempted.

4. The method of claim 3 wherein the additional instructions are reawakened in order of relative age.

5. The method of claim 3, wherein the additional instructions include a first set of instructions having addresses corresponding to a page currently being accessed by the page table walk and a second set of instructions having addresses corresponding to other pages and wherein said first set of blocked instructions are reawakened before said second set.

6. The method of claim 5, wherein instructions within said first set of instructions are re-awakened in order of relative age, then instructions of the second set are re-awakened in order of age.

7. A computer system comprising:

means for issuing instructions, some of which are speculative instructions, each of said instructions specifying a virtual address;

translation lookaside buffer means for storing physical addresses corresponding to selected virtual addresses;

page miss handler means for determining the physical address corresponding to a virtual address for virtual addresses not stored within said translation lookaside buffer means;

memory ordering buffer means for reordering and blocking memory instructions;

blocking means, operative in response to a translation lookaside buffer means miss, for determining whether the page miss handler means is busy and for controlling the memory ordering buffer means to block an instruction causing the translation lookaside buffer miss until the page miss handler means is no longer busy; and wake up means for awakening instructions blocked by the blocking means and for transmitting the awakened instructions to the translation lookaside buffer means.

8. The computer system of claim 7, wherein said blocking means blocks a plurality of instructions, each causing translation lookaside buffer means misses, until the page miss handler is no longer busy.

9. The computer system of claim 8, wherein said wake-up means includes means for awaking all blocked instructions and transmitting said awakened instructions to the translation lookaside buffer in sequence.

10. The computer system of claim 9 wherein said wake-up means transmits the awakened instructions to the translation lookaside buffer means in order of age.

11. The computer system of claim 9 wherein said blocking means blocks instructions of a first type and a second type wherein instructions of the first type are awaiting page information being retrieved by the pending page table walk and instructions of the second type are merely blocked pending completion of any page table walk and wherein said wake-up means awakens and transmits instructions of the first type before instruction of the second type.

12. The computer system of claim 11 wherein said wake-up means transmits the awakened instructions of the first type to the translation lookaside buffer means in order of age then transmits the awakened instructions of the second type in order of age.

13. A computer system comprising:

an instruction fetch and issue unit to issue instructions, some of which are speculative instructions, each of said instructions specifying a virtual address;

a translation lookaside buffer to store physical addresses corresponding to selected virtual addresses;

a page miss handler to determine the physical address corresponding to an instruction for addresses not stored within said translation lookaside buffer;

a memory ordering buffer to reorder and block memory instructions;

a blocking unit, operative in response to a translation lookaside buffer miss to determine whether the page miss handler means is busy and to control the memory ordering buffer to block an instruction causing the translation lookaside buffer miss until the page miss handler is no longer busy; and a wake up unit to awaken instructions blocked by the blocking unit and to transmit the awakened instructions to the translation lookaside buffer.

14. The computer system of claim 13, wherein said blocking unit blocks a plurality of instructions, each causing a translation lookaside buffer means misses, until the page miss handler is no longer busy.

15. The computer system of claim 14, wherein said wake up unit awakens all blocked instructions and transmits said awakened instructions to the translation lookaside buffer in sequence.

16. The computer system of claim 15 wherein said wake up unit transmits the awakened instructions to the translation lookaside buffer in order of age.

17. The computer system of claim 15, wherein said blocking unit blocks instructions of a first type and a second type wherein instructions of the first type are awaiting page information being retrieved by the pending page table walk and instructions of the second type are merely blocked pending completion of any page table walk and wherein said wake up unit awakens and transmits instructions of the first type before instructions of the second type.

18. The computer system of claim 17 wherein said wake up unit means transmits the awakened instructions of the first type to the translation lookaside buffer means in order of age then transmits the awakened instructions of the second type in order of age.

19. A computer system comprising:

a plurality of microprocessors each having an instruction fetch and issue unit to issue instructions, some of which are speculative instructions, each of said instructions specifying a virtual address;

a translation lookaside buffer to store physical addresses corresponding to selected virtual addresses;

a page miss handler to determine the physical address corresponding to the virtual address of an instruction not stored within said translation lookaside buffer;

a memory ordering buffer for reordering and blocking memory instructions;

a blocking unit, operative in response to a translation lookaside buffer miss, to determine whether the page miss handler is busy and to control the memory ordering buffer to block an instruction causing the translation lookaside buffer miss until the page miss handler is no longer busy;

a wake up unit to awaken instructions blocked by the blocking unit and to transmit the awakened instructions to the translation lookaside buffer;

a memory;

an input/output unit; and a system bus interconnecting said microprocessors, said memory and said input/output unit.

20. The computer system of claim 19, wherein said blocking unit blocks a plurality of instructions, each causing translation lookaside buffer means misses, until the page miss handler is no longer busy.

21. The computer system of claim 20, wherein said wake up unit awakens all blocked instructions and transmits said awakened instructions to the translation lookaside buffer in sequence.

22. The computer system of claim 21 wherein said wake up unit transmits the awakened instructions to the translation lookaside buffer means in order of age.

23. The computer system of claim 21 wherein said blocking unit blocks instructions of a first type and a second type wherein instructions of the first type are awaiting page information being retrieved by the pending page table walk and instructions of the second type are merely blocked pending completion of any page table walk and wherein said wake up unit awakens and transmits instructions of the first type before instruction of the second type.

24. The computer system of claim 23 wherein said wake up unit transmits the awakened instructions of the first type to the translation lookaside buffer in order of age then transmits the awakened instructions of the second type in order of age.

25. A microprocessor comprising:

an instruction fetch and issue unit configured to issue instructions, wherein some of said instructions are speculative instructions and each of said instructions specifying a virtual address;

a translation lookaside buffer configured to store physical addresses corresponding to selected virtual addresses;

a page miss handler configured to determine the physical address corresponding to an instruction for addresses not stored within said translation lookaside buffer;

a memory ordering buffer configured to reorder and block memory instructions;

a blocking unit, operative in response to a translation lookaside buffer miss, to determine whether the page miss handler is busy and to control the memory ordering buffer to block an instruction causing the translation lookaside buffer miss until the page miss handler is no longer busy; and a wake up unit for awakening instructions blocked by the blocking unit and for transmitting the awakened instructions to the translation lookaside buffer.

26. The microprocessor of claim 25, wherein said blocking unit blocks a plurality of instructions, each block causing a translation lookaside buffer miss until the page miss handler is no longer busy.

27. The microprocessor of claim 26, wherein said wake up unit awakens all blocked instructions and transmits awakened instructions to the translation lookaside buffer in sequence.

28. The microprocessor of claim 27 wherein said wake up unit transmits awakened instructions to the translation lookaside buffer in order of age.

29. The microprocessor of claim 27 wherein said blocking unit blocks instructions of a first type and a second type, wherein instructions of the first type are awaiting page information being retrieved by the pending page table walk and instructions of the second type are blocked pending completion of any page table walk, and further wherein said wake up unit awakens and transmits instructions of the first type before instructions of the second type.

30. The microprocessor of claim 29 wherein said wake up unit transmits awakened instructions of the first type to the translation lookaside buffer in order of age and then transmits awakened instructions of the second type in order of age.

* * * * *